UNITED STATES PATENT OFFICE.

JOB ABBOTT, OF CANTON, OHIO, ADMINISTRATOR OF THE ESTATE OF WILHELM MEYER, DECEASED.

IMPROVEMENT IN THE MANUFACTURE OF ARTIFICIAL MARBLE.

Specification forming part of Letters Patent No. 86,963, dated February 16, 1869.

*To all whom it may concern:*

Be it known that WILHELM MEYER, of Berlin, Prussia, invented a new and useful Artificial Marble; and that the following is a full, clear, and exact description of the ingredients used in and the mode of preparing the said artificial marble.

The nature of the said invention consists in the making of artificial marble, which is a very close imitation of genuine marble, and which can be made of any color or variety of colors, and in any shape desired, and can be highly polished, and which is adapted to all the uses to which genuine marble is applied, besides being capable of some uses to which ordinary marble cannot be practically applied.

To enable others skilled in the art to make and use this invention, he proceeded to describe its several ingredients, with their proportions, and the mode of compounding them and making the marble with them, and the manner of working and polishing said marble.

The first ingredients to be used are as follows, each ingredient being designated by a letter in the description which is given of the manner of compounding them: $a$, three (3) pounds of linseed-oil; $b$, one (1) pound ten (10) ounces of gum-dammar; $c$, six (6) ounces of iodide of potassium; $d$, twelve (12) ounces of rosin; $e$, one-half ($\frac{1}{2}$) pound of Venetian turpentine; $f$, six (6) pounds of the best slaked and unslaked lime; $g$, nine (9) quarts of water. One half of $a$ is then put into an iron vessel or kettle, together with $b$, $c$, $d$, and $e$, and this kettle is then put over a slow fire, so arranged that the flames cannot come to the top of the kettle and ignite the contents. As soon as the kettle becomes hot the contents are to be well stirred, so as to keep them from boiling over, and this is to be continued until they are well melted and mixed. After this is done strain the contents through a piece of muslin into a warm vessel. Then put $f$ into a clean iron kettle and pour $g$ and then the other half of $a$ in with it. Put this over a slow fire, and, as soon as it gets hot, commence stirring. If the lime is good, it will appear in long streaks, and the stirring must be continued until these streaks disappear and contents are well mixed and cooked. The contents of this second kettle are then strained through muslin into the same vessel with the contents of the first kettle, and this mixture is left until it begins to grow cool, being stirred occasionally. It will then present an appearance of white foam, and is then put into a clean kettle and put over a slow fire, when it should be well stirred until it begins to grow thin. This is called the "fluid compound," and forms the basis of the marble.

The next operation is to form the "putty compound," as it is called, which is done by taking a quantity of the fluid compound in a warm vessel and stirring into it a sufficient quantity of the fine whiting, carefully sifted, to form with it a stiff paste. This paste is then taken out onto a table, over which fine whiting has been sprinkled, and is there kneaded with the hands until it becomes like putty.

To obtain any desired color for this compound, a quantity of the proper color, which has been ground fine, and is free from all lumps, is put into a crock, and enough of the liquid compound is taken to form, with this color, a paint of about the consistency of cream. Then, as the kneading of putty is going on the paint is to be added, in small quantities, from time to time, and well worked in until enough has been used to give the whole lump the desired color.

The amount of color to be used in any case will depend on the strength of color desired, and on the quality of the ingredients, and must therefore be left to the judgment of the workman.

The colors most generally used in the making of artificial marble are zinc-white, the finest Frankfort-black, mahogany-brown, chrome-yellow, and light and dark chrome-green; but other colors may be used, if desired.

Each separate color desired for the marble is prepared in this manner by itself, and when well worked up is to be wrapped up in a moderately-wet cloth and put into a wooden vessel, which is to be covered with a wet cloth to keep out the light, and kept in a room of a uniform temperature of about 75° Fahrenheit. Then, to make any desired piece of marble, take a piece of the putty compound of the most prominent color, of a size depending on the size of the piece of marble desired, then a piece of another desired color, that shall be of a size in proportion to that of the first piece in the ratio of the prominence of the two colors. Then take a piece of each of the other colors, depending in quantity on the prominence desired for such color, and pound and work up each separate piece until it becomes like soft putty. Then the several colors are to be worked together, either by rolling them out into sheets, laying the sheets together, rolling them up into a lump, and giving the lump a good kneading; or the principal colored lump may have the other colored compounds kneaded into it one by one until all the colored compounds are united in one mass; or they may be worked together in any other suitable way, the manner of combining them depending somewhat upon the appearance which the marble is to present, and which must depend wholly on the judgment of the workman.

It is well to cut the lump in two parts with a sharp knife, and turn the two parts around so that the cut faces may come out during the process of working the lump, to insure a more perfect mixing of the colors.

After the piece has been well worked, so as to mix the colors, but not so much as to blend them together, so that each color could not be easily distinguished by itself, the mass is then ready to mold into such shape as may be desired, or to be rolled out into sheets. If it is to be worked into molds, it should be quite warm, so as to be soft and easily pressed into all parts of the mold, where it should be left for several days until it becomes quite dry. The molds should be well powdered inside with whiting before putting in the mass.

Where a sheet of marble is desired the mass should be put on a solid table of dry timber, over which fine whiting has been previously sprinkled, and then it can be worked down with rollers, using first a small roller, and when it is down to about the proper thickness a large roller may be used to get it down to a true surface. A hollow copper roller, filled with warm water, will be found a very useful implement for this purpose. After the sheet is worked down in this way to the proper thickness it is rolled upon a cylinder of from two (2) to four (4) inches in diameter, when it can be taken and unrolled onto a board or table to dry. This sheet or slab should be carefully watched while drying, and if it commences to warp or turn up at the edges it should be turned over and worked down flat.

It is to be here observed that the process of preparing the putty compounds, the working of these compounds into the marble mass, and the working of this mass into sheets or molds should all be carried on in a room of a uniform temperature of from 85° to 100° Fahrenheit; also, that if a marble of considerable specific gravity is desired some sulphate of baryta should be worked into the marble mass before it is made into molds or sheets. This marble may be used as a veneering for furniture, as it can be rolled down as thin as desired, or at least to from one-eighth ($\frac{1}{8}$) to one-sixteenth ($\frac{1}{16}$) of an inch in thickness. When it is to be used as a veneer it is rolled out to the proper thickness and put out to dry, as before shown. After it is well dried, but before it becomes so hard as not to bend, it is applied to the wood to be veneered (which wood must be well seasoned and free from knots and cracks) by means of a glue made by taking one (1) pound of the best glue, which is well cooked in water, and adding one (1) ounce of Venetian turpentine to said mixture of glue and water as soon as it is somewhat cooled. This glue is in no way different from the ordinary preparation used for gluing by furniture-makers, except in the turpentine which is used in it; and the mode of gluing the marble to the wood is not materially different from the mode of applying the ordinary veneer, and need not therefore be further shown. After it is well dried it can be planed off smooth with a common plane, set very fine, and then dressed smooth with a veneer-scraper. The mode of polishing this veneer after scraping is the same as that used for polishing the sheets of marble, which will be shown hereafter. To cut a sheet of this marble a three-cornered instrument, like a file, may be used, by which the sheet is cut one-quarter ($\frac{1}{4}$) to one-half ($\frac{1}{2}$) way through, when it can be broken off like glass. This mode of cutting will only apply where straight lines are to be cut.

If a curved pattern is desired, both sides of the sheet must be kept wet with water along the line to be cut until the sheet at that place becomes like leather, when it may be cut with a knife.

It is to be observed that all cutting of the sheet must be done before polishing, as it is not affected by water after polishing.

To make the first polish, take one or two pounds of the best gum-shellac, pound it fine, and put it into a bottle, with about its bulk of the best alcohol. Shake the bottle well and then cork it tight. Set it in the warm sun or on a stove, so as to distil it. Let this stand until the liquid becomes of a clear yellow color, when this clear yellow liquid is turned off into another bottle, and set away for use. The first bottle may then have more alcohol added, and the former process left to take place, when more polish may be obtained, and so on until all the shellac is dissolved, when the alcohol will no longer become of a clear yellow color, and the residue in the bottle may be thrown away. The second polish is made by reducing the first polish with alcohol until it has only a light yellowish tinge; and the third or final polish is made by taking alcohol and a little benzine and distilling them in a manner similar to the first polish.

To polish a sheet of marble, after it is scraped down smooth it is rubbed down smooth with brimstone and boiled linseed-oil, wiping off the oil carefully with sawdust and a warm dry cloth at intervals during said rubbing. After getting the surface perfectly smooth every trace of oil must be wiped off and the sheet left for an hour or more to dry. When dry, take a cotton cloth, free from color, and after folding it up so as to be several thicknesses thick, pour some of the first polish onto it until it becomes thoroughly saturated, then, folding it up in a linen cloth, rub it over the marble, going from side to side, until the whole sheet is gone over. After this is dry go over it again, and continue this operation until the marble shows a film or skin of polish, being careful to use a clean piece of linen at each rubbing. After this has dried an hour or two take some good alcohol on a clean cloth, with a very little linseed-oil, and rub the whole sheet until it shines. After letting this dry for half an hour, rub well with the second polish; and when that has dried for half an hour or more, the polish is finished by rubbing with the third or final polish.

Having thus fully described his invention, he wished to be understood that although he had given what he considered to be the best proportions and processes for the making of his artificial marble, yet he reserved the right to vary somewhat from these proportions and processes without giving up his title to this invention.

He did not here claim as his invention the liquid compound, nor the putty compounds, nor the polishes herein described, nor the glue herein described, nor any of the ingredients taken separately, as the first are fully shown and claimed in his patent on compounds for the manufacture of artificial marble, and the others are not materially new or novel; but What he did claim as his invention, and desired to secure by Letters Patent, was—

An artificial marble composed of the within-named ingredients and compounded substantially as is herein specified.

JOB ABBOTT,
*Administrator of Wilhelm Meyer, deceased.*

Witnesses:
A. M. STOUT,
CHAS. H. FLETCHER.